United States Patent [19]

Widham

[11] 4,054,958
[45] Oct. 25, 1977

[54] TOILET OF COMPOST TYPE

[76] Inventor: Ernest G. Widham, 247 Shaw St., New London, Conn. 06320

[21] Appl. No.: 649,709

[22] Filed: Jan. 16, 1976

[51] Int. Cl.² .................... A47K 11/02; A47K 13/00
[52] U.S. Cl. ............................................ 4/144; 4/238
[58] Field of Search ........................................ 4/76, 83, 4/84, 86, 109, 111, 116, 119, 123–125, 128, 130, 143, 144, 253, 237–239, 146

[56] References Cited

U.S. PATENT DOCUMENTS

| 1,063,247 | 6/1913 | Ebert | 4/238 |
| 1,210,186 | 12/1916 | Marcuse | 4/144 |
| 1,436,605 | 11/1922 | Ritter | 4/144 |
| 1,774,962 | 9/1930 | Caldwell | 4/144 |
| 2,292,368 | 8/1942 | Gordon | 4/146 |
| 3,366,976 | 2/1968 | Swanson | 4/237 X |
| 3,430,269 | 3/1969 | Bradshaw | 4/238 X |
| 3,435,464 | 4/1969 | Harding | 4/116 X |

FOREIGN PATENT DOCUMENTS 14,029 of 1888 United Kingdom ...................... 4/143

Primary Examiner—Richard E. Aegerter
Assistant Examiner—Stuart S. Levy
Attorney, Agent, or Firm—Walter Spruegel

[57] ABSTRACT

Compost toilet having in the waste receptacle thereof a gate in the form of two hinged companion wings swingable into closed and open positions in and out of the path, respectively, of urine passed into the receptacle by a user of the toilet in standing position, with the wings having scattered leakage paths through which urine passed into the receptacle in closed gate position will trickle into the waste matter below.

2 Claims, 7 Drawing Figures

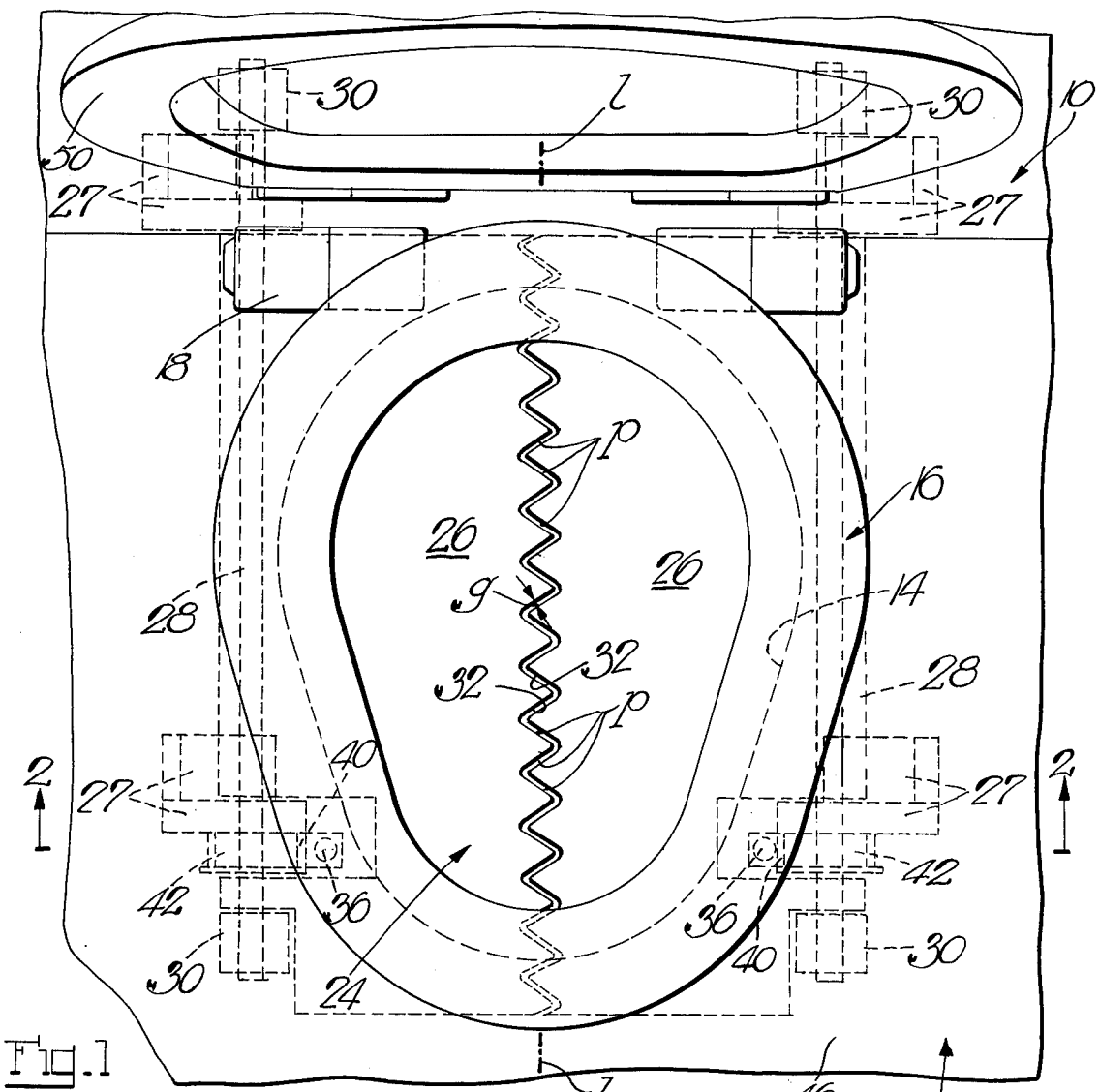
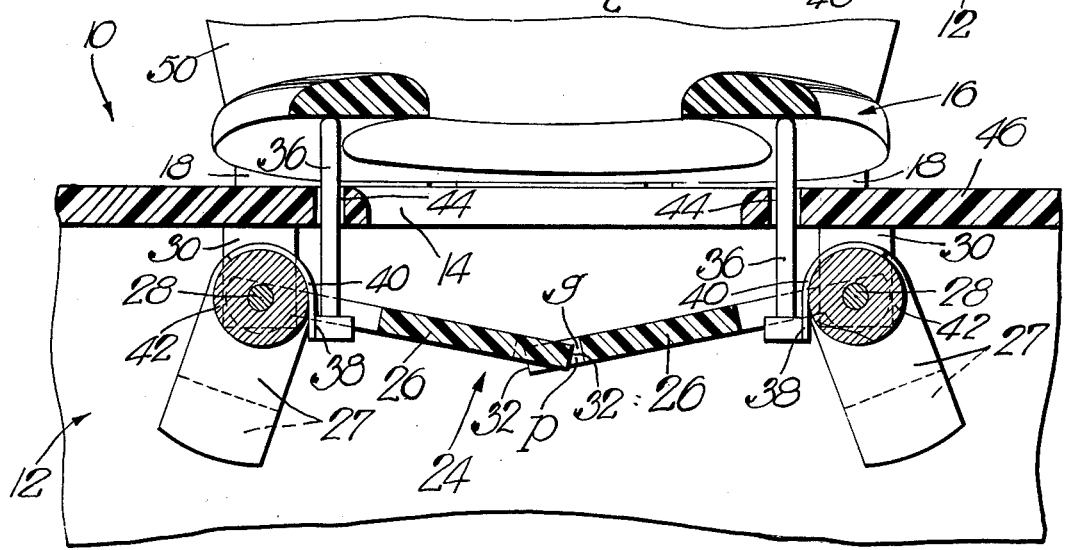
Fig. 1
Fig. 2

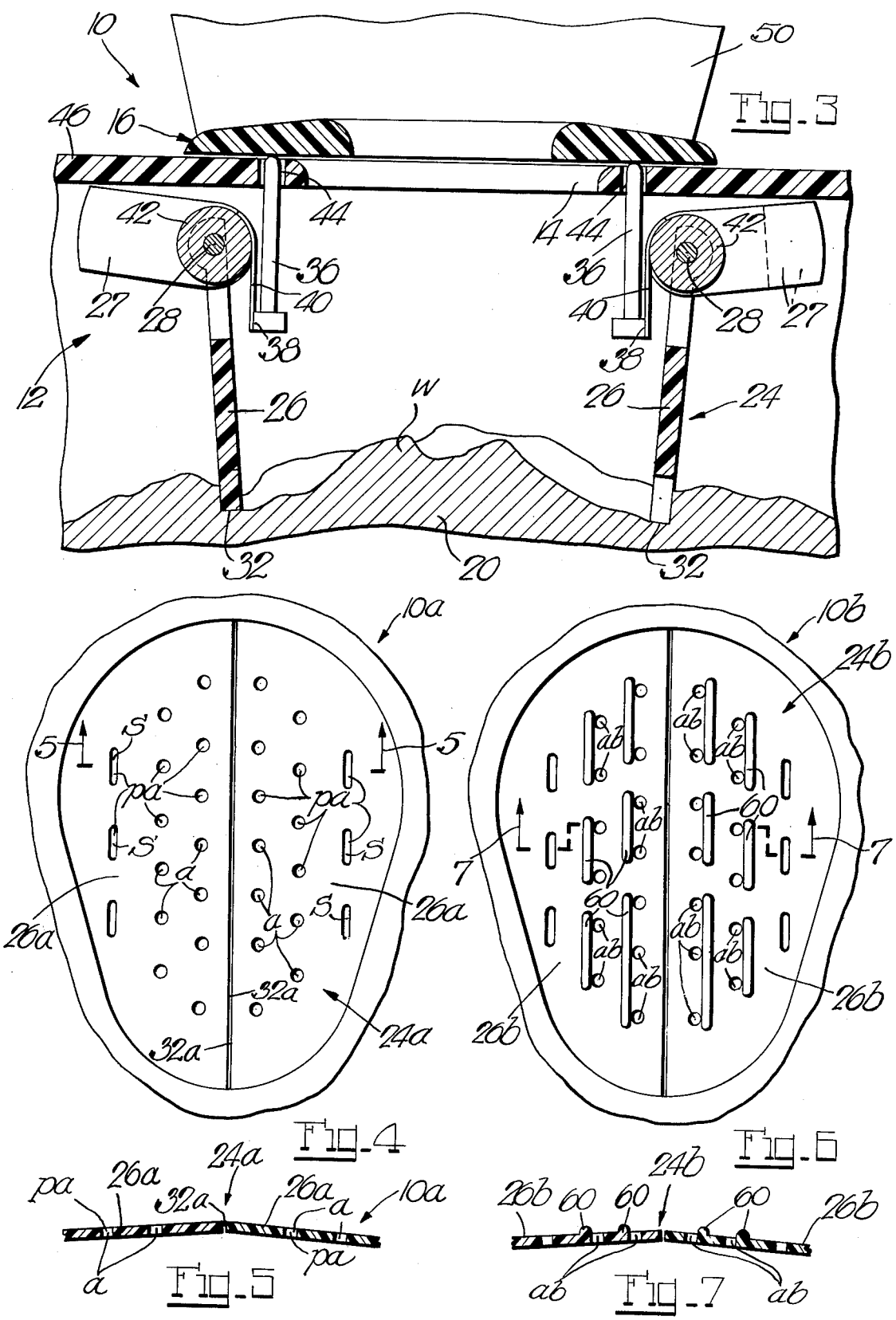

TOILET OF COMPOST TYPE

This invention relates to dry toilets in general, and to toilets of compost type in particular.

In dry toilets of compost type, solid excremental matter expelled by humans into the usual waste receptacle below the accustomed toilet seat is decomposed by interaction between the natural bacteria in such matter and bacteria in a bed of suitable soil maintained in the receptacle, with the decomposition of such solid waste matter being greatly enhanced by a humid environment in the receptacle. The humid environment is maintained in the waste receptacle customarily by suitably controlled heating elements and periodically added liquid, with at least part of the liquid required for efficient decomposition of the solid waste matter being in the form of human urine passed into the waste receptacle in normal use of the toilet. Urine thus passed into the waste receptacle in normal use of the toilet would in most cases be adequate, in amounts, for efficient decomposition of all solid waste matter as it collects in the waste receptacle, if such urine would become more widely distributed through the soil bed instead of being usually passed to the same local areas thereof and there finding a ready escape path of least resistance straight through the soil bed. Hence, it is a task imposed upon users of toilets of compost type to pour liquid, usually water, onto the soil bed in the waste receptacle at least whenever decomposition of solid waste matter slows down appreciably due to inadequate spread of urine in the soil bed.

It is among the objects of the present invention to provide in a toilet of compost type for spreading over the soil bed in the waste receptacle whatever urine is passed into the latter especially by male users who customarily urinate in standing position, without requiring the users to depart from their more or less accustomed ways of either urinating into the middle of the waste receptacle, or pass the urine anywhere into, and thereby at least avoid missing, the waste receptacle. With this arrangement, the spread of urine from steady toilet users, male and female, will in time average out to be adequate for supporting ever proceding decomposition of all excremental waste matter expelled into the receptacle, so that charging the waste receptacle with water will hardly ever become necessary while the toilet is being used and even when the same is temporarily out of use.

It is another object of the present invention to provide a toilet of compost type in which the aforementioned spread of urine in the soil bed is achieved by a gate in the waste receptacle over the soil bed therein which acts like a dam with well scattered leaks in the path of the urine stream from a toilet user in standing position in breaking up the urine stream and discharging it through the leaks in scattered trickles for its spread in the soil bed therebeneath and ensuing promotion of decomposition of solid excremental matter dropped into the waste receptacle. For proper functioning of the gate in this fashion, the same must be arranged to be in the path of the urine stream from a toilet user in standing position, but to be out of the path of solid excremental matter expelled by a toilet user in accustomed sitting position on the toilet seat. To this end, the arrangement of the gate is preferably such that the gate is normally in a closed position in which it is in the path of any matter passed into the waste receptacle, and is shifted into open position only when a toilet user sits down on the toilet seat and expels excremental matter into the waste receptacle, whereby the gate performs, in addition to the primary function of spreading urine in the soil bed in the waste receptacle, another important function of hiding excremental matter in the waste receptacle from view.

It is a further object of the present invention to provide a toilet of compost type, of which the aforementioned gate is formed in two adjacent sections like the wings of a double door, with the gate sections being hinged on their far sides so that they are, in closed gate position, meeting at their near or parting sides, and the aforementioned leaks in the gate are provided in the gate sections in the form of well distributed trickle paths therethrough.

Another object of the present invention is to provide a toilet of compost type of which the aforementioned sections of the gate are arranged to extend, in closed gate position, like the opposite sides of a slanting roof, with the parting sides of the gate sections forming the ridge of the roof and extending preferably longitudinally and midway of the waste receptacle. With this arrangement, the upward slant of the sections of the closed gate to their parting sides in a middle region of the waste receptacle where urine from standing users of the toilet will most likely hit the gate, is particularly advantageous in that it induces run-off of much of the passing urine on the closed gate sections out of this middle region of the waste receptacle and toward more widely scattered trickle paths through the gate sections, with ensuing wider spread of the urine over and in the soil bed in the waste receptacle.

Further objects and advantageous will appear to those skilled in the art from the following, considered in conjunction with the accompanying drawings.

In the accompanying drawings,

FIG. 1 is a fragmentary plan view of a compost toilet embodying the invention;

FIG. 2 is a fragmentary section through the toilet taken substantially on the line 2—2 of FIG. 1;

FIG. 3 is a section through the toilet similar to the section of FIG. 2, but showing the toilet in a different condition of use;

FIG. 4 is a fragmentary top view of a compost toilet embodying the invention in a modified manner;

FIG. 5 is a fragmentary section through the modified toilet as taken on the line 5—5 of FIG. 4;

FIG. 6 is a fragmentary top view of a compost toilet embodying the invention in a further modified manner; and FIG. 7 is an enlarged fragmentary section through the modified toilet of FIG. 6, with the section taken on the line 7—7 of FIG. 6.

Referring to the drawings, and more particularly to FIGS. 1 to 3 thereof, the reference numeral 10 designates a dry toilet of compost type having an enclosed waste receptacle 12 with a top opening 14 and a seat 16 thereabove on which to sit when using the toilet except for urinating in a standing position. The seat 16 is hinged on top of the receptacle 12 as at 18 so as to be swingable into open and closed positions.

Provided in the bottom of the waste receptacle 12 is a bed 20 of suitable soil, such as peat moss, for example, with human waste matter $w$ being discharged onto the soil bed 20 by users of the toilet. The waste receptacle 12 has in its bottom suitably controlled, usually electrical, heating elements (not shown) which furnish heat as needed to maintain in the receptacle a humid environment in which decomposition of the deposited solid waste matter is promoted by interaction between the natural bacteria in the latter and bacteria in the soil bed.

Urine passed into the waste receptacle 12 by users of the toilet contributes, of course, toward maintaining the humid environment in the receptacle 12. However, while urine thus passed into the waste receptacle by users of the toilet would generally be adequate, in amount, to maintain in the receptacle the requisite humid environment for ever proceding and efficient decomposition of all solid waste matter as it is discharged into the toilet in accustomed use of the same, such urine is passed all too frequently to more or less local places of the waste-holding soil bed where the urine stream finds an escape path through the soil bed without spreading and dwelling in the latter to the extent necessary for maintaining the environment in the receptacle at the humidity level required for sustained and efficient decomposition of the solid waste matter. In consequence, prior toilets of compost type do require some supervision and attention from time to time in passing liquid, usually water, into the waste receptacle to make up for occasional shortages of the urine from the toilet users to maintain the environment in the receptacle at an average humidity level for adequate and sustained decomposition of the solid waste matter.

In order to eliminate, to all practical intents and purposes, the need for supervision and occasional servicing of the present compost toilet to maintain the environment in its waste receptacle 12 at the required humidity level for steady and efficient waste decomposition, the toilet provides a system of urine distribution in the soil bed 20 which features a dam or gate 24 in the waste receptacle 12. The gate 24 is formed in two companion sections or leaves 26 which are swingable, like the wings of a double-door, into the open and closed positions in FIGS. 3 and 2, respectively. To this end, the leaves 26 are at their far sides carried by parallel shafts 28 which are journalled in suitable bearings 30 in the top of the waste receptacle 12. Weights 27 on the shafts 28 normally hold the gate 24 in its closed position (FIG. 2) in which the leaves 26 are in vertical alignment with the toilet opening 14 and are substantially continuous with each other at their adjacent or parting sides 32 except for a narrow gap $g$ therebetween (FIG. 1). The gate 24 is in its closed position in the path of any matter, including urine, passed into the waste receptacle 12 through the top opening 14 therof, with the leaves 26 of the gate being provided with scattered leakage paths $p$ through which urine of a stream broken up by the closed gate trickles onto the waste-holding soil bed 20 in fairly well distributed fashion. The scattered leakage paths $p$ through the closed gate 24 are provided in this instance by the gap $g$ between the parting sides 32 of the leaves 26 of exemplary zig-zag outline along the median line $l$ of the waste receptacle, with these leakage paths being, therefore, narrow and continuous and extending in transverse directions longitudinally and laterally of the waste receptacle 12.

It is, of course, imperative that the gate 24 is in its open position (FIG. 3) whenever a user of the toilet passes a bowel movement, so that excrement expelled by the user will drop through the open gate onto the soil bed 20 for decomposition thereon. With the user of the toilet then sitting on the seat 16 in accustomed manner, the toilet seat 16 is in this instance used to advantage for controlling the position of the gate 24, with the hinged seat 16 being operatively linked to the gate 24 so that the seat is in the slightly raised position in FIG. 2 when the gate is in its closed position, and the gate 24 is opened when the seat 16 is depressed from the position in FIG. 2 into the down position in FIG. 3, i.e., when a user of the toilet sits down on the seat 16 for the purpose of passing a bowel movement. The seat 16 is thus operatively linked with the gate 24 by vertical rods 36 which at 38 are connected with flexible tapes 40 that are passed part-way over pulleys 42 on the shafts 28 and secured thereto with their ends, with the rods 36 extending with fair clearance through apertures 44 in the top wall 46 of the waste receptacle 12 and underneath the seat 16. Thus, with the weights 27 normally holding the gate 24 in its closed position, the rods 36 are projected upwardly to hold the seat 16 in the slightly raised position in FIG. 2. However, when a person intends to use the toilet for passing a bowel movement thereinto, he or she will sit down on the seat 16 and thereby depress the same to its lower position (FIG. 3), with the seat 16 then depressing the rods 36 and thereby opening the gate 24 against the tendency of the weights 27 to close the same.

The gate 24 performs its urine-distributing function only when in closed position, i.e., when a user, generally a male, uses the toilet for urinating in standing position. Of course, many persons using a toilet when sitting on the seat for passing a bowel movement also pass urine at the same time, and such urine, while not distributed over the soil bed by the then open gate 24, will nevertheless be beneficial by adding to the moisture required for proper functioning of the toilet. While the gate 24 thus serves a most important purpose in distributing urine over the soil bed 20 in the waste receptacle 12, the gate is further advantageous in that it also serves to hide excrement in the waste receptacle from view. Preferably, the toilet also has a hinged cover 50 which can be closed over the seat 16 in its slightly raised position.

While in the described toilet 10 of FIG. 1 the urine leakage paths $p$ are formed by the narrow gap between the parting sides of zig-zag outline of the closed leaves 26 and the latter are also slightly slanted downwardly toward their parting sides (FIG. 2), FIG. 5 shows a compost toilet 10$a$ with a gate 24$a$ of which the leaves 26$a$ are provided with urine leakage paths $pa$ in the form of apertures $a$ and also slots $s$ which are, for fairly wide urine distribution over the soil bed therebeneath, spaced in two transverse directions, i.e., longitudinally and laterally of the waste receptacle. The parting sides 32$a$ of the leaves 26$a$ are in this instance straight, and they are narrowly spaced from each other in closed gate position. Further, and in distinct contrast to the downward slant of the leaves 26 of the closed gate 24 to their parting sides as in FIG. 2, the leaves 26$a$ are arranged to slant, preferably only very slightly, upwardly to their parting sides 32$a$ in closed gate position (FIG. 5), thereby to induce run-off of much of the urine on the closed leaves 26$a$ away from the middle of the gate to more widely spaced leakage paths $pa$ for optimum urine distribution over the soil bed.

FIG. 6 shows a compost toilet 10$b$ with a gate 24$b$ which is similar to the gate 24$a$ of the toilet 10$a$ of FIGS. 4 and 5, except that the leaves 26$b$ are provided on their upper surfaces with ridges 60 which extend generally longitudinally, and are spaced from each other longitudinally and laterally, of the waste receptacle (see also FIG. 7), with the ridges 60 being so coordinated with the urine leakage apertures $ab$ as to direct urine to paired-ones of these apertures.

What is claimed is:

1. In a compost toilet, the combination with a longitudinal waste receptacle and a seat with an opening to and centered on the receptacle therebeneath, of a gate in said receptacle providing hinged companion leaves for their swinging movement into open and closed gate positions, with said leaves having parting sides and being in closed gate position substantially continuous with each other at said parting sides, said parting sides being disposed substantially horizontally and extending longitudinally and substantially midway of said waste receptacle in closed gate position, and said leaves being located in said receptacle to be in and out of vertical alignment with said seat opening in closed and open gate positions, respectively, with said leaves slanting upwardly to said parting sides in said closed gate position, and having restricted urine leakage paths therethrough scattered in transverse directions within the vertical confines of said seat opening in said closed gate position.

2. The combination in a compost toilet as in claim 1, in which said leaves have top surfaces facing said seat in said closed gate position, and said leaves are provided on said top surfaces with ridges which are spaced from the respective parting sides and also from each other longitudinally of said waste recepacle, and extend substantially longitudinally of said waste receptacle, for directing urine flowing against the ridges in the closed gate position along said ridges.

* * * * *